Figure 1:
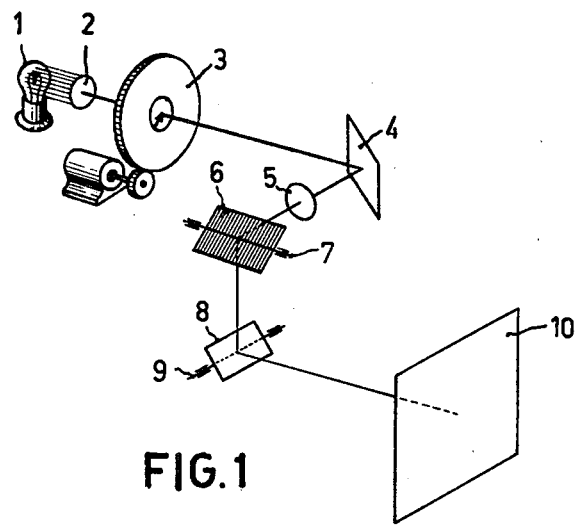

Nov. 2, 1965   G. VAN GELDER ETAL   3,215,033
CONTROL SYSTEM FOR INDICATOR PROJECTOR
Filed Sept. 14, 1962   4 Sheets-Sheet 1

INVENTOR
GOZEWIJN VAN GELDER
WILHELMUS L. VERVEST
HENDRIK W. DE VRIES
LAMBERT KRIEK
BY
AGENT

INVENTOR
GOZEWIJN VAN GELDER
WILHELMUS L.VERVEST
HENDRIK W. DE VRIES
LAMBERT KRIEK
BY
AGENT

Nov. 2, 1965   G. VAN GELDER ETAL   3,215,033
CONTROL SYSTEM FOR INDICATOR PROJECTOR
Filed Sept. 14, 1962   4 Sheets-Sheet 3

FIG.6ª

INVENTOR
GOZEWIJN VAN GELDER
WILHELMUS L.VERVEST
HENDRIK W. DE VRIES
LAMBERT KRIEK
BY
AGENT

INVENTOR
GOZEWIJN VAN GELDER
WILHELMUS L. VERVEST
HENDRIK W. DE VRIES
LAMBERT KRIEK

BY
AGENT

United States Patent Office 3,215,033
Patented Nov. 2, 1965

3,215,033
CONTROL SYSTEM FOR INDICATOR PROJECTOR
Gozewijn van Gelder, Wilhelmus Lambertus Vervest, Hendrik Willem de Vries, and Lambert Kriek, Hilversum, Netherlands, assignors to North American Philips Company, Inc., New York, N.Y., a corporation of Delaware
Filed Sept. 14, 1962, Ser. No. 223,675
Claims priority, application Netherlands, Sept. 28, 1961, 269,715
6 Claims. (Cl. 88—24)

This invention relates to projectors for projecting an indicator sign, such as an arrow, on a screen by means of two rotary mirrors having intersecting axes of rotation, the first mirror directing the image of the indicator sign produced by a light source to the second mirror which projects the sign onto the screen, the sign being moved across the screen by rotation of the mirrors about their axes. Such a projector is suitable as a help with lectures and the like, the speaker thus being able to indicate certain points on the screen without using a stick. The projector is also suitable for use in regulating traffic in any form by indicating, for example, the intensity of the traffic in a given zone. To this end, a chart of the relevant zone may be projected on a greatly enlarged scale to find out by means of the projector at what points steps are necessary.

It is usually possible to project either on a spherical surface, or on a plane or curved surface. If projected on a flat screen the movement of the sign on the screen resulting from a rotation of the second mirror does not take place along a straight line. The ray emanating from the second mirror upon rotation of this mirror describes the peripheral surface of a cone and the line followed by the sign on the screen constitutes the intersection of the conical periphery and the screen. If the second mirror is rotated and the first mirror remains immovable the projected sign indicates a point of a hyperbola upon projection on a plane screen. It may be desirable for the projection sign, upon rotation of the second mirror, to describe a line differing from a hyperbola, for example a straight line. The indication of the sign differs considerably from, for example, a straight line especially at the corner points of the screen.

An object of the invention is to correct the indication of the position of a sign which differs from a desired indication, for example a straight line. According to the invention this is achieved in that the mechanisms for moving the mirrors are coupled together by means of members bringing about a correcting rotation of one mirror as a function of the position of the second mirror in order to obtain a prescribed movement, for example rectilinear, of the sign projected on a surface of given shape upon rotation of the second mirror. Consequently, the position of the second mirror is a measure of the correction.

In a known embodiment a correction is also used, it is true, but the said deviation in the position of the sign is not eliminated. It is achieved only that, if the first mirror is rotated and the second mirror remains immovable, the path covered by the indicator sign on the screen is along a straight line proportional to the angular displacement of the driving mechanism for the first mirror. On various straight lines (dependent upon the position of the second mirror) the path covered is in each case proportional to the angular displacement of the driving mechanism, but the absolute value is not always the same, resulting in the deviation of position.

In one embodiment of the invention the driving mechanism for the first mirror comprises a translatable part to which a rod for displacing the mirror is movably connected by screw thread, said rod being provided with a transverse pin the end of which is urged against a surface consisting of two parts which are pivotably connected together and each adapted to be inclined at an angle, the angle of inclination being adjustable by means of two feeler pins operated, at one of their ends, by two cams provided on the translating part of the driving mechanism for the second mirror and engaging, at their other ends, part of the adjustable surfaces. The correction in the position of the indicator sign is obtained by a correcting displacement of the first mirror. Upon rotation of the second mirror the pin on the rod follows the adjustable surface so that the rod is rotated and displaced in an axial direction due to the threaded connection, resulting in the position of the first mirror being corrected. If the second mirror remains immovable and the first mirror is rotated the sign describes a straight line on the flat screen the position of which depends upon the position of the second mirror. Now also a correction takes place due to the pin sliding over the inclined surface and hence acting upon the first mirror. By means of this correction it is achieved that the sign, upon a given rotation of the first mirror, always covers the same path for different positions of the second mirror. The indicator sign thus always occupies the desired position on the screen even if both mirrors are rotated.

In another embodiment of the projector according to the invention the driving mechanism for the first mirror comprises a translatable part operating through a pivotal strip a rod rotating the mirror, said strip extending transversely to the direction of movement of the translating part and the rod and being displaced by a knife edge provided on a pin journalled to be slidable transversely to the translatable part of the driving mechanism, the end of said pin being urged against a table displaceable in the direction of height by means of a pin connected thereto, the end of which is urged against the surface of a curved guide path connected to the translatable part of the driving mechanism for the second mirror. In this embodiment also a correcting displacement is imparted to the first mirror, dependent upon the position of the second mirror. The pivotal strip acts as a lever the length of one arm of which is dependent upon the knife edge which engages the lever and is adjustable in the direction of height. The first mirror acquires the desired correction at each position of the second mirror by variation in the ratio of the lever.

It is also possible to obtain a correct position of the sign by correcting the position of the second mirror. According to the invention, to this end, the second mirror has, in addition to its first axis of rotation, a second axis of rotation which is at right angles thereto, the mirror being suspended cardanically and the suspension mechanism for the second axis of rotation being connected to an arm the free end of which has a feeler pin which may scan an arcuate surface in order to rotate the mirror about the second axis upon rotation of the mirror about the first axis, which arcuate surface may be moved by the driving mechanism for the first mirror.

In order to obtain, upon displacement of the translatable part of the driving mechanism with equal steps, a displacement of the indicator sign across the screen with the same step size, the driving mechanism for each mirror may be constituted, according to the invention, by a bolt-and-nut construction the nut of which is movable and, upon displacement, imparts a deflection to a pivotally arranged lever which causes a rotation of the mirror through a transmission gear having a transmission ratio of 1:2. Due to the transmission ratio of 1:2, the angular displacement of the lever is equal to the angular displacement of the rays emerging from the mirror. The sign makes equal steps on the screen by giving the lever a deflection in equal steps.

In a projector according to the invention the intersecting axes of rotation are preferably at right angles to one another, the axes being located, at least substantially, in the associated planes of the mirrors. By such an arrangement it is avoided that, if the indicator sign has the shape of an arrow, the arrow on the screen is turned upon displacement of the mirrors.

The indicator sign may be in the form of an arrow, but may alternatively be built up of a combination of signs which may be colored, if desired.

Figure 3:
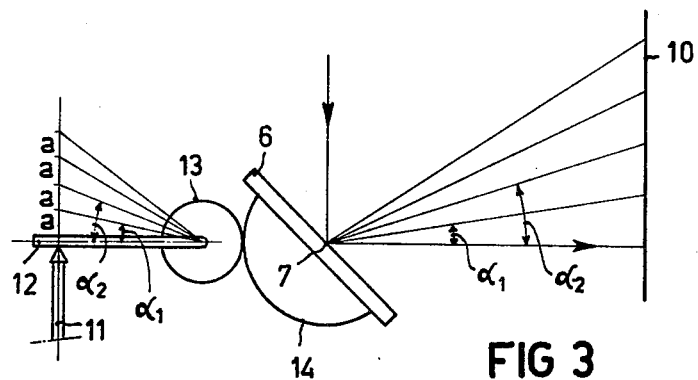
Figure 2:
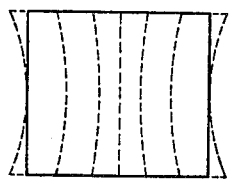
Figure 4:
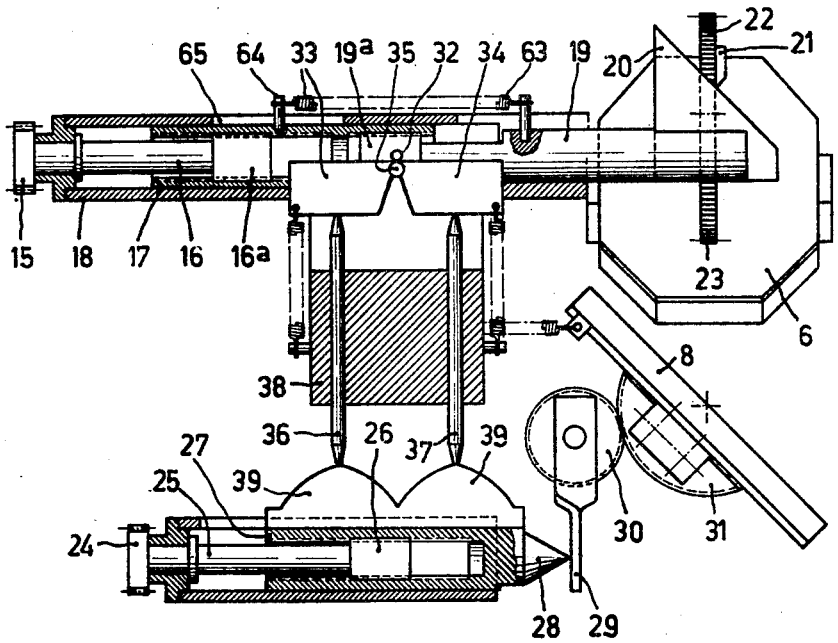
Figure 5:
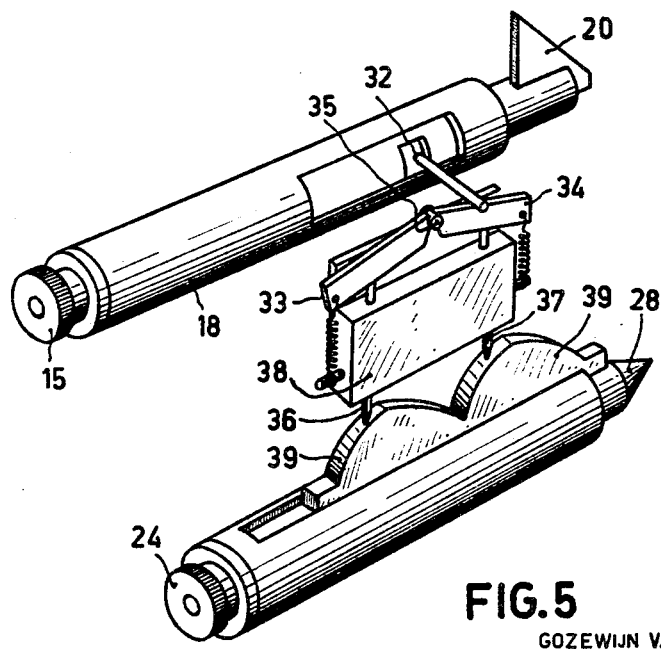
Figure 6:
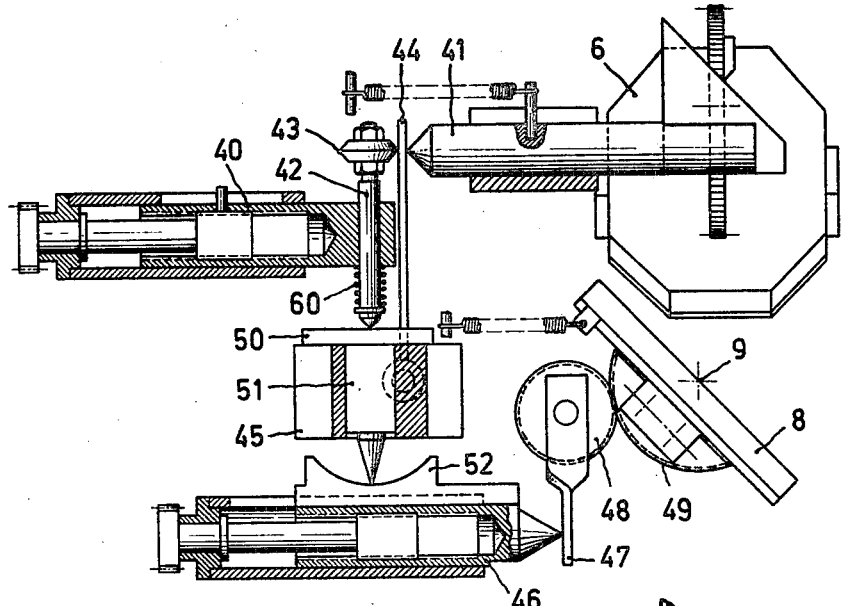
Figure 7:
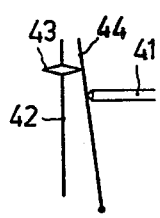
Figure 7:
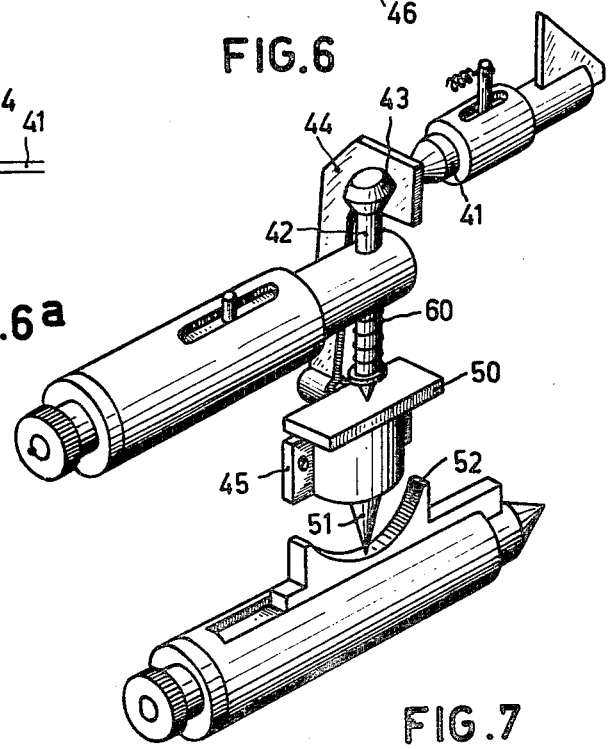
Figure 8:
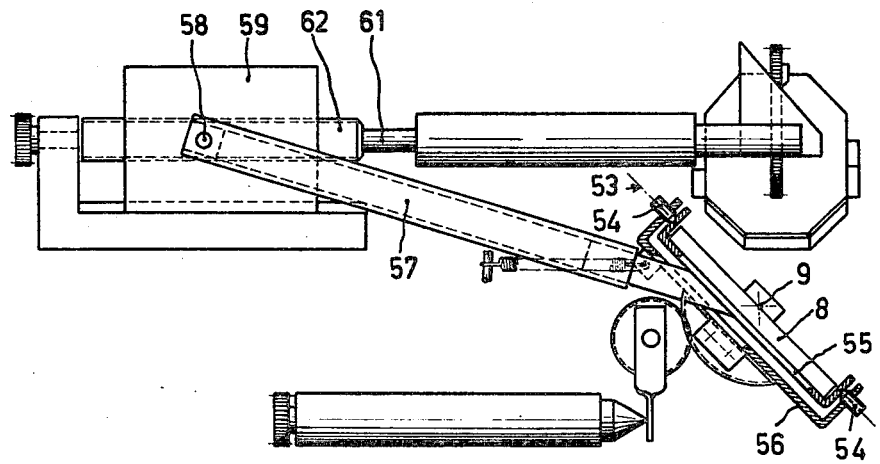
Figure 9:
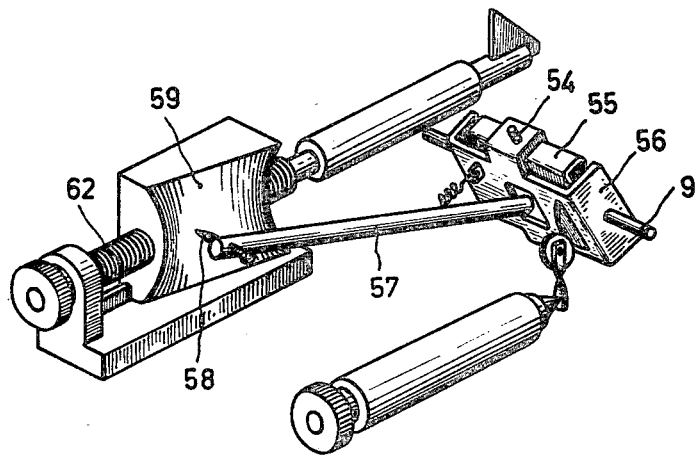

In order that the invention may be readily carried into effect, the several embodiments thereof will now be described in detail, by way of example, with reference to the accompanying diagrammatic drawings, in which:

FIGURE 1 is a diagrammatic view of the projector;
FIGURE 2 is a front elevation view of a flat projection screen with the widths of the projected sign upon displacement of the second mirror without the use of correction;
FIGURE 3 is a diagrammatic view of a portion of the mechanism for displacing a mirror;
FIGURE 4 is a cross-sectional view partly in elevation of a first embodiment of the correcting members;
FIGURE 5 is a perspective view of this embodiment;
FIGURE 6 is an alternative embodiment of the correcting members shown in FIG. 4;
FIGURE 6a is a diagrammatic view of the lever mechanism;
FIGURE 7 is a perspective view of the embodiment of FIG. 6a;
FIGURE 8 shows another embodiment of the construction shown in FIG. 4, and
FIGURE 9 is a perspective view thereof.

In the projector shown in FIGURE 1, the light from a light source 1 is directed through a condenser lens 2 to a rotary disc 3 which contains an indicator sign, for example in the form of an arrow, and which may be rotated in accordance with the desired direction of the arrow. The indicator sign may alternatively be built up of several signs or digits provided on transparent discs or plates positioned after one another. The horizontal beam of rays then strikes an immovable mirror 4 which turns the beam in the horizontal plane through an angle of 90° and causes it ultimately to leave the projector in its longitudinal direction. The sign is directed from mirror 4 to an objective 5 and thence to a first rotary mirror 6 which can rotate about an axis 7 and displaces the sign on the screen in one direction, for example the horizontal direction. The beam of rays strikes mirror 6 at the centre of its axis of rotation. The ray emanating from mirror 6 impinges on a second rotary mirror 8 at a point of its axis of rotation 9 dependent upon the angular adjustment of the first mirror 6. The mirror 8 displaces the sign on the screen in a vertical direction. The screen on which the sign is projected is indicated by 10.

The skew axes 7 and 9 may be at any arbitrary angle to one another. However, it is desirable for the axes 7 and 9 to be at right angles to one another and to be located, at least substantially, in the associated planes of the mirrors. It is thus ensured that the direction of the projected arrow does not vary upon rotation of the mirrors.

If mirror 8 is immovable and mirror 6 is rotated about the axis 7 the sign describes a straight horizontal line on the plane screen 10. In fact, the ray emanating from mirror 8 is co-planar with the axis 9, which has a horizontal position in the arrangement of FIGURE 1. However, if the mirror 6 is immovable and mirror 8 is rotated, the line followed by the sign is usually a vertical straight line. It is often desirable, for example when projecting on part of a map, that the sign should traverse a line of a different shape, for example a straight line, upon rotation of mirror 8. When mirror 8 is rotated about its axis 9 the ray emanating therefrom describes the peripheral surface of a cone having axis 9 as its axis of revolution. Upon projection on a plane screen the sign traverses a hyperbola (see FIGURE 2) instead of a straight line so that upon vertical adjustment, despite the immovable mirror 6, a deviation in the horizontal direction occurs. The position of the sign on the screen thus differs from the position desired. Especially at the corner points of the screen the deviation from the indication of the position of the sign may assume a magnitude which cannot be tolerated. The correcting means for this indication of position will be described further hereinafter.

If the mirror is rotated in equal steps, for example by means of a step motor the distance covered by the indicator sign on the screen during sequential equal steps will not be the same. When starting from the projection center the distance covered by the sign becomes larger upon each following step. However, it is desirable for the sign to cover the same distance upon each step. This is made possible by the transmission gear shown in FIGURE 3 which is used in a projector according to the invention. A translatable member 11 driven by the step moves a lever 12 through equal distances $a$. The lever acts upon gear wheels 13 and 14 with a transmission ratio of 1:2. Mirror 6 is connected to gear wheel 14. If lever 12 is displaced through a distance $a$ or an angle $\alpha$ the mirror rotates through an angle $\alpha/2$ and the emerging ray through an angle $\alpha$. Consequently, the projected sign covers the same distance on the screen upon each step $a$ of the member 11, as may be clearly seen from FIGURE 3.

FIGURES 4 and 5 show a first embodiment of correcting means as used in the projector. An electric motor (not shown) for rotating mirror 6, preferably a step motor which rotates through the same angle upon each pulse received, may drive a gear wheel 15 connected to a shaft 16. The end of shaft 16 has a thicker head 16a which is threaded. The head 16a is secured to one end of an elongated nut 17 which moves in an axial direction upon rotation of shaft 16. The nut can slide in a sleeve 18 arranged co-axially thereof. A rod 19 having a thicker threaded portion 19a is connected to the other end of nut 17. Upon axial displacement of the nut, rod 19 follows this movement and turns a lever 21 by means of a displacing member 20 secured to the rod. To avoid any play in the screwed connection, a spring 63 is provided between nut 17 and rod 19. The spring 63 is secured to nut 17 by means of a pin 64 which can move in a slot 65 of the immovable sleeve 18. This securement also ensures that nut 17 cannot rotate but is shifted only in the axial direction. The lever 21 has connected to it a gear wheel 22 which meshes with a gear wheel 23. The transmission ratio of the gear wheels is 1:2. Mirror 6 is secured to gear wheel 23.

The driving means for the second mirror comprise a second step motor which causes rotation of a shaft 25 through a gear wheel 24. The shaft 25 has, at its end, a thicker portion 26 which is threaded and provided in an elongated nut 27. Upon rotating the shaft 25 the nut undergoes a translating movement through the same distance upon each step of the motor. The end of nut 27 is provided with a pin 28 for displacing a lever 29. This lever causes a rotation of gear wheels 30 and 31 with a transmission ratio of 1:2, thus rotating the second mirror 8 secured to gear wheel 31.

The thicker portion of rod 19 provided in nut 17 has a transverse pin 32 which projects to the exterior through an aperture of sleeve 18. The pin 32 is thrust by means of a resilient member against a surface comprising two parts 33 and 34 which are connected to a hinge 35, fixedly arranged in the projector, and which may be adjusted in inclined positions. The angles of inclination of the surface parts are adjusted by means of pins 36 and 37 arranged to be slidable in a block 38 forming part of the housing of the projector. The pins bear, at one of their ends, against the lower sides of the surfaces 33 and 34 and, at their other ends, against cams 39 provided on the nut 27 of the displacing mechanism for the second mirror. The surfaces 33 and 34 are thrust against the pins by means of springs.

If the second mirror is rotated due to translation of nut 27 the threaded portion 26 causes an axial displacement of nut 27, resulting in the cams 39 also being displaced through the same distance. Consequently, the pins 36 and 37, which keep in engagement with the cams due to the pressure of the springs, move downwards in block 38, thus giving the surfaces 33 and 34 inclined positions dependent upon the displacement of nut 27. The pin 32 will follow the movement of the surface (see FIGURE 5) so that rod 19 is rotated. Due to the screwed connection between the rod 19 and the nut 17, rod 19 is displaced in an axial direction and imparts a correcting displacement to mirror 6 through lever 21 and gear wheels 22 and 23. By suitable shaping of the cams the deviation of the sign in a horizontal direction due to the traversal of a hyperbola when mirror 8 displaces the sign in a vertical direction will be corrected by the correcting rotation of mirror 6 which determines the horizontal position of the sign. This correcting rotation of mirror 6 thus depends upon the position of mirror 8. Upon rotation of mirror 8, the sign now deescribes the desired line on the screen due to the correction imparted to mirror 6 by rod 19. If mirror 8 is immovable and mirror 6 is rotated due to a rotation of the threaded portion of rod 16 which displaces nut 17, pin 32 slides over the inclined surface 33, 34 and thus causes a rotation of rod 19. Mirror 6 thus acquires a correcting rotation in addition to its rotation as a result of the axial displacement of nut 17. By the use of the transmission gear shown in FIGURE 3, the sign covers the same distance on a horizontal line upon each step. However, the distances covered by the sign on lines located at different heights are different. Due to the said correcting rotation of mirror 6 it is ensured that the step distance of the sign is the same on all horizontal lines located at different heights (dependent upon the position of mirror 8). Upon a combined rotation of mirrors 6 and 8 the sign is therefore always projected on the screen in the correct position.

FIGURE 5 shows the correcting members upon displacement of the cams 39 and a resulting inclined adjustment of the surfaces 33 and 34. If mirror 6 is placed at an angle of 45° the surfaces 33 and 34 will be aligned and correction does not occur since the sign then describes a vertical line across the middle of the screen upon rotation of mirror 8 (see FIGURE 2).

FIGURES 6, 6a and 7 show a second embodiment of the correcting members. In this case also bolt-and-nut constructions driven by step motors are used for rotating the mirrors. A rod 41 is not connected directly to a nut 40 but is displaced by means of a slidable pin 42 provided at the end of nut 40 transversely to the direction of movement thereof, pin 42 having a knife edge 43 which may operate a strip 44. This strip engages the end of rod 41 and is pivotally connected to a block 45 fixedly arranged in the housing of the projector. Strip 44 must preferably have a shape such that its pivot and the points of application of knife edge 43 and rod 41 are aligned. To this end, strip 44 may be made, for example, very thin. Mirror 8 is rotated by means of a nut 46 which operates a lever 47 and gear wheels 48 and 49, thus causing a rotation of mirror 8 about its axis 9. Nut 46 has a curved guide path 52 which can move back and forth with the nut. The pin 42 provided in nut 40 bears, at its end remote from knife edge 43, on a table 50 which is adjustable in the direction of height and can be slidably moved in block 45 by means of a pin 51. At its end remote from table 50, pin 51 has a feeler engaging the guide path 52. A spring 60 prevents unwanted movement of pin 42 and thrusts pin 51 against the guide path.

If mirror 8 is immovable and mirror 6 is rotated nut 40 is displaced and knife edge 43 of pin 42, which pin slides over table 50, moves the lever 44. This strip-shaped lever influences rod 41, thus giving mirror 6 the desired deflection. Since strip 44, as shown in FIGURE 6a, assumes an inclined position upon axial displacement of nut 40, the rod 41, if mirror 8 is not adjusted at an angle of 45° (whereby knife edge 43 and rod 41 would be located at the same height, instead of being displaced through the same distance as is nut 40) acquires a correcting displacement differing from that of nut 40 due to the lever action of strip 44, thus ensuring that the sign always covers the same distance upon each step along all horizontal lines followed which differ in height. Upon translation of nut 46 the guide path 52 is also displaced, thus causing table 50 to move in the direction of height. The knife edge 43 now influences strip 44 in a point located higher so that a correcting rotation eliminating the hyperbolic distortion is imparted to mirror 6. This correcting transmission is shown diagrammatically in FIGURE 6a. By displacement of guide path 52, pin 42 will always act upon another point of the lever 44, which thus acquires another slope so that a matched correction of mirror 6 is obtained for each adjustment of mirror 8 and the projected sign indicates the desired position on the screen.

FIGURES 8 and 9 show a third embodiment of the correcting means used in the projector. In this embodiment the correcting rotation is imparted to mirror 8, which for this purpose may rotate not only about its axis 9 but also about an axis 53 which is at right angles thereto. To this end, mirror 8 is secured to a support 55 which is suspended cardanically in a holder 56 by means of pins 54. Support 55, which is rotatable about axis 53, has secured to it an arm 57 which projects to the exterior through an aperture in holder 56. The end of arm 57 is provided with a feeler pin 58 which is urged, for example by means of a spring, against an arcuate surface 59 to scan this surface. The arcuate surface 59 has a nut-like portion which engages in a threaded portion 62 provided on a shaft 61 of the driving mechanism for mirror 6. Upon rotation of the driving mechanism for mirror 6 the arcuate surface 59 is displaced with respect to feeler pin 58. If mirror 8 is deflected about its axis of rotation 9 the arm 57 is forced to follow this movement and feeler pin 58 will describe a path over the arcuate surface 59. The feeler pin is displaced in the direction of height and thus causes a displacement of support 55. This support causes a rotation of mirror 8 about axis 53, at right angles to the axis of rotation 9. This rotation provides a correction in horizontal direction of the sign projected on screen 10. Mirror 8, when deflected about axis 9, acquires a certain correction about axis 53, dependent upon the shape of the arcuate surface, thus eliminating the incorrect indication of the position of the sign on the screen. If mirror 8 is immovable and mirror 6 is rotated, mirror 8 is also deflected about axis 53 since the arcuate surface 59 is moved by means of the threaded portion 62. This deflection in turn ensures that, if mirror 6 is driven in a stepwise manner, the projected sign covers equal distances on the screen along any horizontal line.

The shape and the position of the correcting members may be either calculated, or determined experimentally and depend upon the desired co-ordinates and hence upon the question as to whether the indicator sign, upon rotation of mirror 8, describes a straight line or a curved line of desired shape on the screen. The shape of the projection screen is also of influence. In the embodiments described use was made of a plane screen, but it is also possible for the screen to have a curved surface. Instead of using the bolt-and-nut construction, the devices for rotating the mirrors may alternatively utilize other means which convert a rotation into a translation.

It is possible to use a plurality of projectors each directing an indicator sign to the screen so as to enable, for example, the route of a plurality of road users or groups of road users to be followed.

What is claimed is:

1. A system for controlling the movement of a projected image on a screen created by a light source comprising two spaced mirrors, driving means for rotating said mirrors, one of said mirrors directing said projected image produced by said light source to the other mirror which in turn projects the image on the screen, said image being moved across said screen by the rotation of said mirrors about their axes, means coupling said mirrors together whereby the rotation of either mirror is corrected as a function of the angular position of the other mirror in order to obtain a prescribed movement of the image upon said screen of a given shape when said other mirror rotates.

2. A system for controlling the movement of a projected image on a screen created by a light source as claimed in claim 1 wherein said means for rotating said one mirror comprises a part adapted for rectilinear movement, a rod, means connected to one end of said rod and said mirror for rotating the same, a screw-threaded element movably connected to said rod, said rod being provided with a transverse pin, two elements pivotally connected together and each adapted to be inclined at an angle, the free end of said transverse rod being in engagement with one of said pivoting elements, two feeler pins each operatively engaging at one end a surface of one of said elements, a translating device for said other mirror having a pair of cams thereon, and the other ends of said feeler rods engaging said cams on said translating device to thereby elevate and lower said feeler rods.

3. A system for controlling the movement of a projected image on a screen created by a light source as claimed in claim 1 wherein said other mirror has two axes of rotation at right angles to one another, a suspension system for said other mirror and said second axis of rotation, an arm connected at one end to said suspension system and having a feeler pin at the free end thereof, said driving means for said one mirror having an arcuate surface, said feeler pin engaging said arcuate surface and being movable thereover whereby said other mirror is rotated about its second axis upon rotation of the same about its first axis, said arcuate surface being moved by said driving means for said one mirror.

4. A system for controlling the movement of a projected image on a screen created by a light source comprising two spaced mirrors, driving means for rotating said mirrors, one of said mirrors directing said projected image produced by said light source to another mirror which in turn projects the image on the screen, said image being moved across said screen by the rotation of said mirrors about their axes, means coupling said mirrors together whereby the rotation of either mirror is corrected as a function of the angular position of the other mirror in order to obtain a prescribed movement of the image upon said screen of a given shape when said other mirror rotates, said means for rotating said one mirror comprising a part adapted for rectilinear movement, a pivotable strip, and a rod coacting with said part and pivotal strip to rotate said one mirror, a pin extending substantially transverse to the direction of movement of said part adapted for rectilinear movement, said pin having a knife edge which engages said pivotable strip to thereby displace said rod, a table slideable in the direction of its height, a projection on said table, a translatable drive mechanism for said other mirror having an inclined surface, said projection on said table engaging said inclined surface and when said drive mechanism moves said pin and knife edge are moved which in turn moves said rod to rotate said one mirror.

5. A system for controlling the movement of a projected image on a screen created by a light source comprising two spaced mirrors, driving means for rotating said mirrors, one of said mirrors directing said projected image produced by said light source to another mirror which in turn projects the image on the screen, said image being moved across said screen by the rotation of said mirrors about their axes, means coupling said mirrors together whereby the rotation of either mirror is corrected as a function of the angular position of the other mirror in order to obtain a prescribed movement of the image upon said screen of a given shape when said other mirror rotates, said strip extending transversely to the direction of movement of said part adapted for rectilinear movement, and said inclined surface being a curved guide path for said projection.

6. A system for controlling the movement of a projected image on a screen created by a light source comprising two spaced mirrors, driving means for rotating said mirrors, one of said mirrors directing said projected image produced by said light source to another mirror which in turn projects the image on the screen, said image being moved across said screen by the rotation of said mirrors about their axes, means coupling said mirrors together whereby the rotation of either mirror is corrected as a function of the angular position of the other mirror in order to obtain a prescribed movement of the image upon said screen of a given shape when said other mirror rotates, a pivotally arranged lever and a transmission gear wherein the driving means for each mirror comprises a bolt and nut construction, the nut of which is movable and which, upon displacement, imparts a deflection to said pivotally arranged lever which causes a rotation of the corresponding mirror through said transmission gear having a transmission ratio of 1:2.

References Cited by the Examiner
UNITED STATES PATENTS
2,714,199   7/55   Adams et al. _____ 88—24

NORTON ANSHER, *Primary Examiner.*
EMIL G. ANDERSON, *Examiner.*